March 29, 1960 A. C. WALKER 2,930,205
COMBINED REFRIGERATION AND STARTING SYSTEMS FOR AIRCRAFT
Filed May 6, 1957
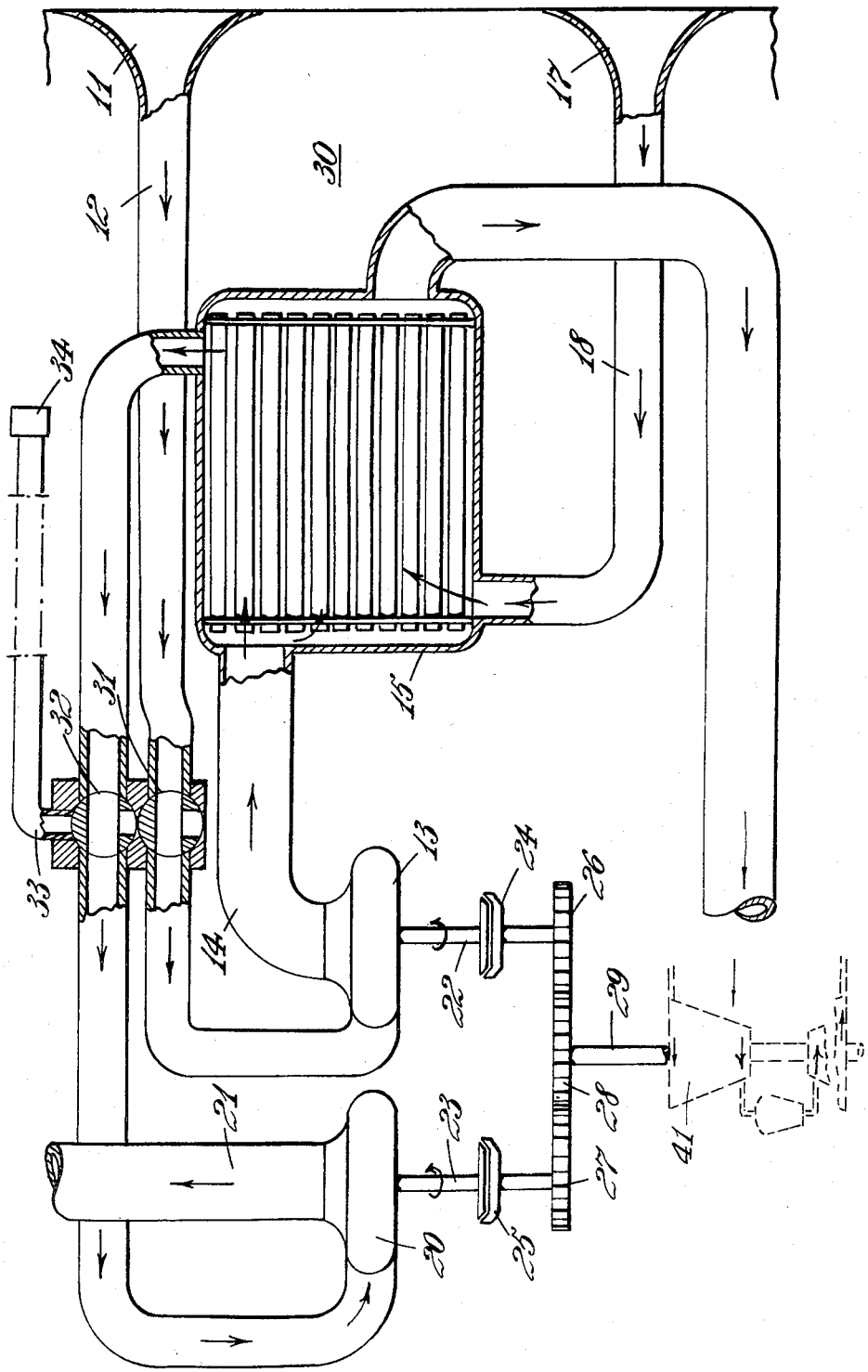

United States Patent Office 2,930,205
Patented Mar. 29, 1960

2,930,205

COMBINED REFRIGERATION AND STARTING SYSTEMS FOR AIRCRAFT

Allen Chivers Walker, Gloucester, England, assignor to Rotol Limited, Gloucester, England, a British company Application May 6, 1957, Serial No. 657,243

Claims priority, application Great Britain May 8, 1956

4 Claims. (Cl. 62—241)

This invention relates to refrigeration systems for aircraft, and in particular high speed aircraft.

In aircraft it is often necessary to provide a refrigeration system for use in cabin air conditioning, and in the case of high speed aircraft an additional cooling requirement is the need to cool certain components of the aircraft structure to maintain the heat load upon these components of the structure within safe limits. Heat load upon the aircraft structure is produced by frictionally generated heat which passes through the boundary layer of the aircraft under forced convection, solar radiation, particularly at high altitudes, and heat generated internally of the aircraft by the operation of electrical and hydraulic systems within the aircraft.

An object of the present invention is to provide an improved aircraft refrigeration system.

A further object is to provide a refrigeration system employing heat extracting turbines connected so as to be capable, when driven, of starting a propulsion engine of the aircraft, the propulsion engine loading the turbines.

A still further object is the provision of a refrigerating system employing heat extracting turbines using ram air whereby ram air pressure may be used in flight to start the propulsion engine. A still further object is the provision of means whereby compressed air from a suitable source may be used to drive the heat extracting turbines to start the propulsion engine when the aircraft is stationary on the ground.

One embodiment of the present invention will now be described, merely by way of example, with reference to the accompanying drawing which diagrammatically illustrates a refrigeration system according to the invention, the system being employed in an high speed aircraft for cooling structural components of the aircraft.

Referring to the drawing the system comprises a first ram air intake 11 in the wing 30 of the aircraft, which ram air intake 11 opens into a first inlet duct 12 which leads to a first turbine 13. The exhaust side of the rotor of the turbine 13 opens into a first exhaust duct 14 which leads to a heat exchanger 15, and from the heat exchanger to atmosphere.

A second ram air intake 17 in the wing 30 opens into a second inlet duct 18 which leads through the heat exchanger 15 to a second turbine 20. The exhaust side of the rotor of the turbine 20 opens into a second exhaust duct 21 which leads air exhausting from the turbine 20 to those components of the aircraft structure which require cooling.

The rotors of the turbines 13 and 20 are keyed each to a shaft 22 and 23 respectively and the shafts 22 and 23 each incorporate a unidirectional clutch or freewheel device 24 and 25. The end of each shaft 22, 23 carries a gear wheel 26 and 27 keyed thereto, and both gear wheels 26 and 27 mesh with a gear wheel 28 which is keyed to a shaft 29, which drives a main rotatable assembly of an engine, in the example at present being described, the compressor rotor/turbine rotor assembly of a gas turbine engine 41 installed in the wing 30 of the aircraft, which assembly is rotated to start the gas turbine engine 41.

The clutches 24 and 25 are arranged so that drive cannot be transmitted from the engine 41 to the turbines 13 and 20 but only from the turbines to the engine 41. In this manner it is ensured that compressed air passing through the turbines is always required to do work and therefore that it is always cooled.

Each of the inlet ducts 12 and 18 is provided with a valve, 31 and 32 respectively, rotation of which through 90° from their normal operating position as shown connects a compressed air duct 33 with the inlets to the turbines 13 and 20, at the same time closing off the ram air inlets 11 and 17 from communication with the inlets to the turbines.

The duct 33 leads to some convenient point on the aircraft structure where it is provided with a coupling 34 for connection to a compressed air line from a suitable source such as a compressed air bottle on a ground trolley.

In operation, when the aircraft is in flight, the valves 31, 32 are set into their normal operating position as shown in the drawing and ram (i.e. compressed) air entering the ram air intake 11 passes through the duct 12 and drives the turbine 13. The expansion of the compressed air through the turbine 13 results in a lowering of the temperature of the air, the cooler air passing through the duct 14 and the heat exchanger 15 to atmosphere.

Ram air entering the second ram air intake 17 passes through the duct 18 and is brought into heat exchange relationship with the cooler air exhausting from the turbine 13 in the heat exchanger 15, and is therefore cooled. This cooler air passes thence to the turbine 20 and drives the turbine 20, the expansion of the cooled compressed air through the turbine 20 resulting in a further temperature drop of the air, so that the air exhausting from the turbine 20 and passing through the exhaust duct 21 to the structural components requiring cooling is, relatively, very cold.

This final temperature is dependent, of course, upon the forward speed of the aircraft.

The power obtained from the two turbines 13 and 20 is fed into the engine 41 through the shafts 22 and 23, via the clutches 24 and 25 and the gearing 26, 27 and 28. Each turbine is, therefore, constrained to run at some function of the engine speed.

When the aircraft is in flight the drive from the turbines to the rotational assembly of the gas turbine power plant, which is rotated to start the plant, may be used to start the plant. When the aircraft is parked on the ground an air line from compressed air starting equipment on a ground trolley, may be coupled to the coupling 34 and compressed air from the air line used to drive the turbines and therefore the power plant in order to start the power plant. In this case the valves 31 and 32 must, of course, be first adjusted into their position connecting the inlets of the turbines with the duct 33.

I claim:

1. In an aircraft having a propulsion engine including a rotatable assembly powered to rotate against a load during operation of the engine and rotatable to start the engine, a refrigeration system comprising a first air turbine, a second air turbine, a first inlet duct connected to convey compressed air to said first turbine to operate the turbine, a second inlet duct connected to convey compressed air to said second turbine to operate said second turbine, and a first exhaust duct connected to receive air exhausting from said first turbine, and to lead it into heat exchange relationship with compressed air passing to said second turbine through said second inlet duct, first transmission means drivably connecting said first turbine with said rotatable assembly of the propulsion engine, and second transmission means drivably connecting said second turbine with said rotatable assembly of the propulsion engine, said first and second transmission means each including a unidirectional clutch, said clutches preventing the transmission of drive from the rotatable assembly of the propulsion engine to said turbines.

2. A refrigeration system as claimed in claim 1, wherein said first and second inlet ducts each communicate with a ram air intake on the aircraft.

3. A refrigeration system as claimed in claim 1, comprising a compressed air duct adapted for connection to a source of compressed air, and valve means adjustable to communicate the inlets of said turbines alternatively with ram air intake means on the aircraft and said compressed air duct.

4. In an aircraft having a propulsion engine including a rotatable assembly powered to rotate against a load during operation of the engine and rotatable to start the engine, a combined refrigeration and starting system comprising a heat extracting air turbine, an air inlet duct for conveying compressed air to the turbine to operate the turbine, and transmission means drivably connecting said turbine with said rotatable assembly, said transmission means including a unidirectional clutch connected to transmit drive from said turbine to said rotatable assembly and to prevent the transmission of drive from said rotatable assembly to said turbine.

References Cited in the file of this patent

UNITED STATES PATENTS

| | | |
|---|---|---|
| 2,391,838 | Kleinhans | Dec. 25, 1945 |
| 2,479,991 | Wood | Aug. 23, 1949 |
| 2,524,065 | Mayer | Oct. 3, 1950 |
| 2,557,099 | Green | June 19, 1951 |